(12) United States Patent
Anesi et al.

(10) Patent No.: US 9,743,375 B2
(45) Date of Patent: Aug. 22, 2017

(54) LOCATION TRACKING

(71) Applicants: Charles C. Anesi, Phoenix, AZ (US);
Wayne Mekjian, Scottsdale, AZ (US);
Eric H. Castain, Moraga, CA (US);
Brian J. Hanafee, Pleasanton, CA (US)

(72) Inventors: Charles C. Anesi, Phoenix, AZ (US);
Wayne Mekjian, Scottsdale, AZ (US);
Eric H. Castain, Moraga, CA (US);
Brian J. Hanafee, Pleasanton, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 112 days.

(21) Appl. No.: 14/451,898

(22) Filed: Aug. 5, 2014

(65) Prior Publication Data

US 2016/0044625 A1   Feb. 11, 2016

(51) Int. Cl.
*H04W 24/00* (2009.01)
*H04W 64/00* (2009.01)
*H04W 12/04* (2009.01)
*H04W 12/02* (2009.01)
*H04L 29/08* (2006.01)

(52) U.S. Cl.
CPC .............. *H04W 64/00* (2013.01); *H04L 67/18* (2013.01); *H04W 12/02* (2013.01); *H04W 12/04* (2013.01); *H04L 67/306* (2013.01)

(58) Field of Classification Search
CPC ..... H04W 64/00; H04W 12/04; H04W 4/028; H04W 4/02; H04W 12/08; H04W 12/12; H04W 4/22; H04W 76/007; H04W 68/00; H04W 12/02

USPC ....... 455/410, 411, 433, 435.1, 456.1, 456.2, 455/456.3, 456.5
See application file for complete search history.

(56) References Cited

U.S. PATENT DOCUMENTS

| | | | |
|---|---|---|---|
| 6,838,998 B1 | 1/2005 | Brown et al. | |
| 6,947,755 B1 * | 9/2005 | Gould | H04W 64/00 340/426.19 |
| 7,047,426 B1 * | 5/2006 | Andrews | G06F 21/88 707/E17.032 |

(Continued)

OTHER PUBLICATIONS

"On Your Tracks: GPS Tracking in the Workplace", National Workrights Institute, 2010, https://epic.org/privacy/workplace/gps-traking.pdf.

*Primary Examiner* — Jean Gelin
(74) *Attorney, Agent, or Firm* — Walter | Haverfield LLP; James J. Pingor

(57) ABSTRACT

One or more embodiments of techniques or systems for location tracking are provided herein. A system for location tracking may be utilized to track or determine one or more locations for one or more devices of one or more users. A tracking system or control component may be utilized to access or initiate requests for location tracking, such as for legitimate purposes or business reasons. For example, a system for location tracking may be implemented as an application or tracking application installed on a mobile device or a device or a user. A device may transmit a key to a third party and encrypted location data to a tracking entity. The application may have a front-end interface (e.g., for users being tracked) and a back-end interface (e.g., for users initiating tracking). In this manner, location tracking is provided while promoting privacy and safety.

20 Claims, 6 Drawing Sheets

(56) References Cited

U.S. PATENT DOCUMENTS

| | | |
|---|---|---|
| 7,330,112 B1 * | 2/2008 | Emigh ............... B60R 25/1004 340/429 |
| 7,570,958 B2 * | 8/2009 | Krasner ................ H04W 4/02 455/456.1 |
| 8,395,968 B2 | 3/2013 | Vartanian et al. |
| 8,412,147 B2 | 4/2013 | Hunter et al. |
| 8,489,063 B2 | 7/2013 | Petite |
| 8,521,710 B2 | 8/2013 | Daly et al. |
| 8,538,374 B1 | 9/2013 | Haimo et al. |
| 8,538,458 B2 | 9/2013 | Haney |
| 8,588,733 B2 | 11/2013 | Ferguson et al. |
| 8,624,727 B2 | 1/2014 | Saigh et al. |
| 8,639,597 B2 | 1/2014 | Clifford et al. |
| 2001/0055392 A1 * | 12/2001 | McDonnell ........... H04M 15/00 380/258 |
| 2005/0136946 A1 * | 6/2005 | Trossen ................ H04W 4/02 455/456.2 |
| 2008/0166992 A1 | 7/2008 | Ricordi et al. |
| 2010/0106801 A1 * | 4/2010 | Bliss .................... G06F 17/3087 709/219 |
| 2011/0231092 A1 * | 9/2011 | Kuo ......................... G01S 5/16 701/532 |
| 2012/0015621 A1 | 1/2012 | Cerny et al. |
| 2012/0042046 A1 * | 2/2012 | Petersen ............ G06Q 30/0282 709/219 |
| 2012/0106738 A1 * | 5/2012 | Belenkiy ............... H04L 9/0872 380/270 |
| 2012/0290311 A1 | 11/2012 | Tara et al. |
| 2013/0166198 A1 | 6/2013 | Funk et al. |
| 2013/0322415 A1 | 12/2013 | Chamarti et al. |
| 2014/0062790 A1 * | 3/2014 | Letz .................... H04L 67/1095 342/386 |
| 2014/0089049 A1 * | 3/2014 | Cristofaro .......... G06Q 30/0203 705/7.32 |
| 2015/0262123 A1 * | 9/2015 | Sharma .................. H04W 4/02 705/333 |

* cited by examiner

LOCATION TRACKING

BACKGROUND

Generally, location tracking may be achieved utilizing global positioning systems (GPS) within a device or mobile device. For example, location tracking may enable a user to utilize location based services. However, privacy may be a concern to users when location tracking is enabled on his or her device or mobile device.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

In one or more embodiments, location tracking is provided in a "switch on/switch off" manner for one or more users. This enables locations of one or more users to be determined in different scenarios, such as when a valid business reason exists for location tracking. In other words, a system for location tracking may enable one user to track or determine the location of one or more other users, as appropriate. Example scenarios where tracking may be enabled via a location tracking system include emergencies, such as system emergencies, data center disasters, weather emergencies, tornadoes, blizzards, storms, terrorist attacks, or other unforeseen events.

To this end, a location tracking application or mobile application may be installed on one or more mobile devices (e.g., smartphones, cellular devices, remote devices, portable devices, etc.) of one or more users (for whom location tracking may be desired). In other words, employees, users, team members, participants, individuals, or entities who wish to participate may install a corresponding application or location tracking application on their respective devices to facilitate location tracking. An application or location tracking application may communicate with a tracking system (e.g., associated with a tracking entity), which may be implemented as a server, a central component, or a control component. Additionally, an application or system for location tracking may pass information, such as an encryption key, to third parties for safekeeping, thereby preserving confidentiality. In one or more embodiments, the control component or tracking system may initiate a request or transmit a request to activate location tracking for one or more devices or mobile devices.

A request for location tracking may be initiated in different ways or with different criteria. For example, a system for location tracking may be centrally invoked or selectively invoked based on a location of a user, one or more user attributes (e.g., office location, place of business, schedule, calendar appointments, work location, current location, real-time location, present geographical location, job description, job title, job duties or job function, organization, hierarchy, job type, personal preferences), skill sets, expertise in an area (e.g., CPR certified), one or more capabilities associated with a user, one or more user attributes for other users (e.g., a distress beacon of another user, team member, co-worker, acquaintance, such as when another individual is on a friend list for a user, etc.), or one or more situational factors (e.g., duration of location tracking, duration of an emergency, number of distress beacons activated, a danger level associated with a scenario or emergency, etc.). Criteria or parameters associated with a request may include time frames during which tracking is requested, a reporting interview or a frequency of location tracking or transmittal of encrypted location data to a tracking entity, which may be open ended (e.g., from a point going forward, etc.).

In this way, a search or a request for location tracking may be initiated for a set of employees capable of fixing a power outage (e.g., based on expertise of one or more users and location relative to an outage), among other things, for example. Another example of a request for location tracking may include requests for location tracking of employees of a branch of an office (e.g., having a specific work address).

Location data may be encrypted using a key, and the encrypted location data may be sent to a first party, such as a tracking entity. The key, on the other hand, may be sent or transmitted to another party, such as a third party, a fiduciary, etc., who holds the key until a request is made by the tracking entity (or, in some cases, the user) to provide that key to the tracking entity. In other words, the third party may hold the encryption key while the tracking entity receives encrypted location data from mobile devices of users (e.g., employees). When a legitimate business purpose arises, the tracking entity may request the encryption key from the third party to decrypt the location data. In one or more embodiments, the third party may provide the encryption key to the tracking entity upon request (e.g., without user consent). In other embodiments, the third party may provide the encryption key to the tracking entity based on user consent or automatic consent, such as after a timeout period. Without the encryption key, the tracking entity may not be able to access the location data to determine a location of a user. Similarly, without the location data, the third party has no way to determining the location of the user. In this way, safety and privacy may be promoted while location tracking is consistently performed or fed to the tracking entity.

The control component may enable requests to be activated, initiated, or utilized from multiple devices, such as different mobile devices. In this example, an interface component may provide an interface which allows a user to initiate a request for location tracking on a mobile device based on a level of access associated with the user. In other words, if the user is a high-level user, a super user, or has sufficient access rights or privileges, he or she may utilize an application installed on a device or mobile device to initiate location tracking for one or more users.

In one or more embodiments, this application used to track users may be the same application or a part of applications which provide locations of users when location tracking is enabled. Explained another way, in one or more embodiments, a location tracking application may include a front-end user interface and a back-end user interface. The front-end of the interface may be accessible to users to be tracked or enrolled in tracking, while the back-end of the interface may be utilized or accessible to users for initiating tracking requests, for example.

In other embodiments, different applications may be utilized for different groups of users. Here, for example, tracking applications may be installed on devices or mobile devices of one or more users (for whom location tracking may be desired) and a control application may be utilized (on one or more control devices) to initiate requests for location tracking associated with one or more of the users who have the tracking application installed. Regardless, location tracking may be provided such that the privacy of users, team members, or employees may be preserved. In other words, location tracking may merely be enabled when legitimate purposes exist, such as legitimate business reasons, emergencies, or for public health and safety, etc.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DESCRIPTION

Figure 1:
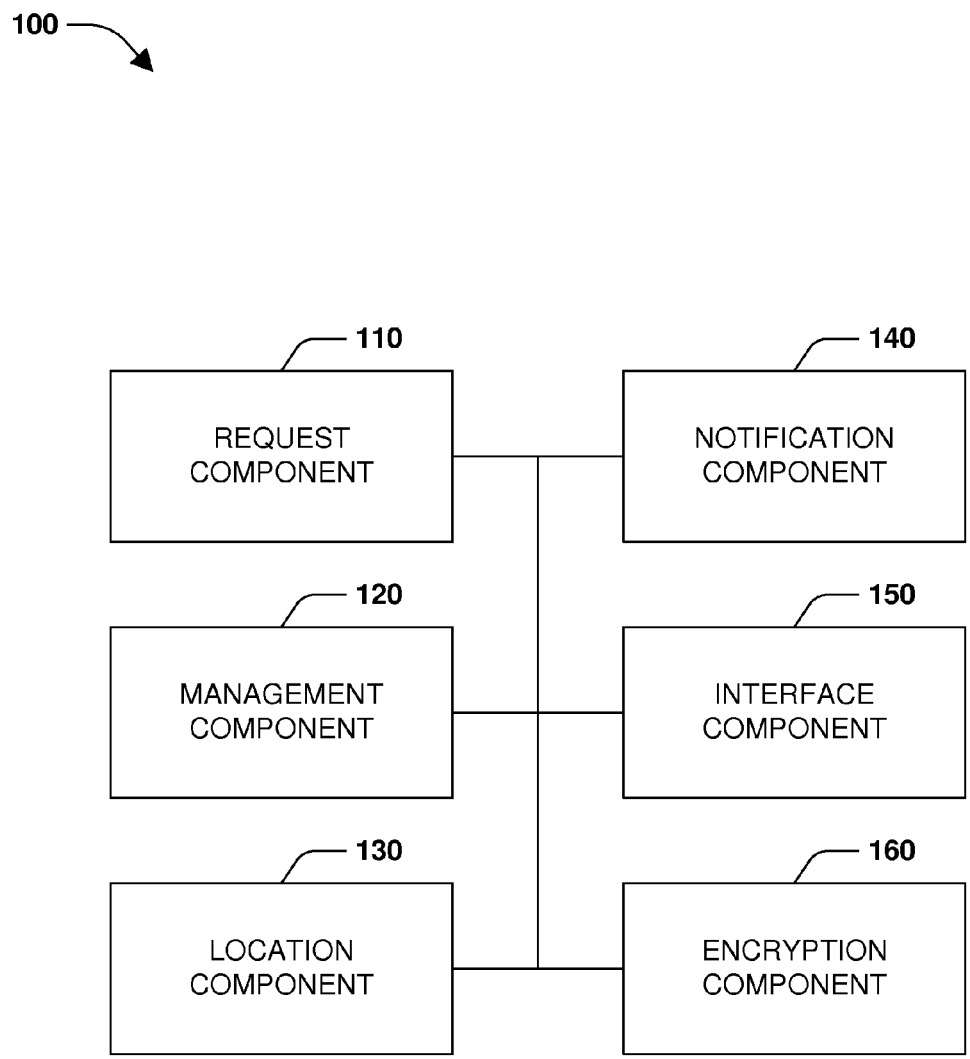
FIG. 1 is an illustration of a component diagram of an example system for location tracking, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 6:
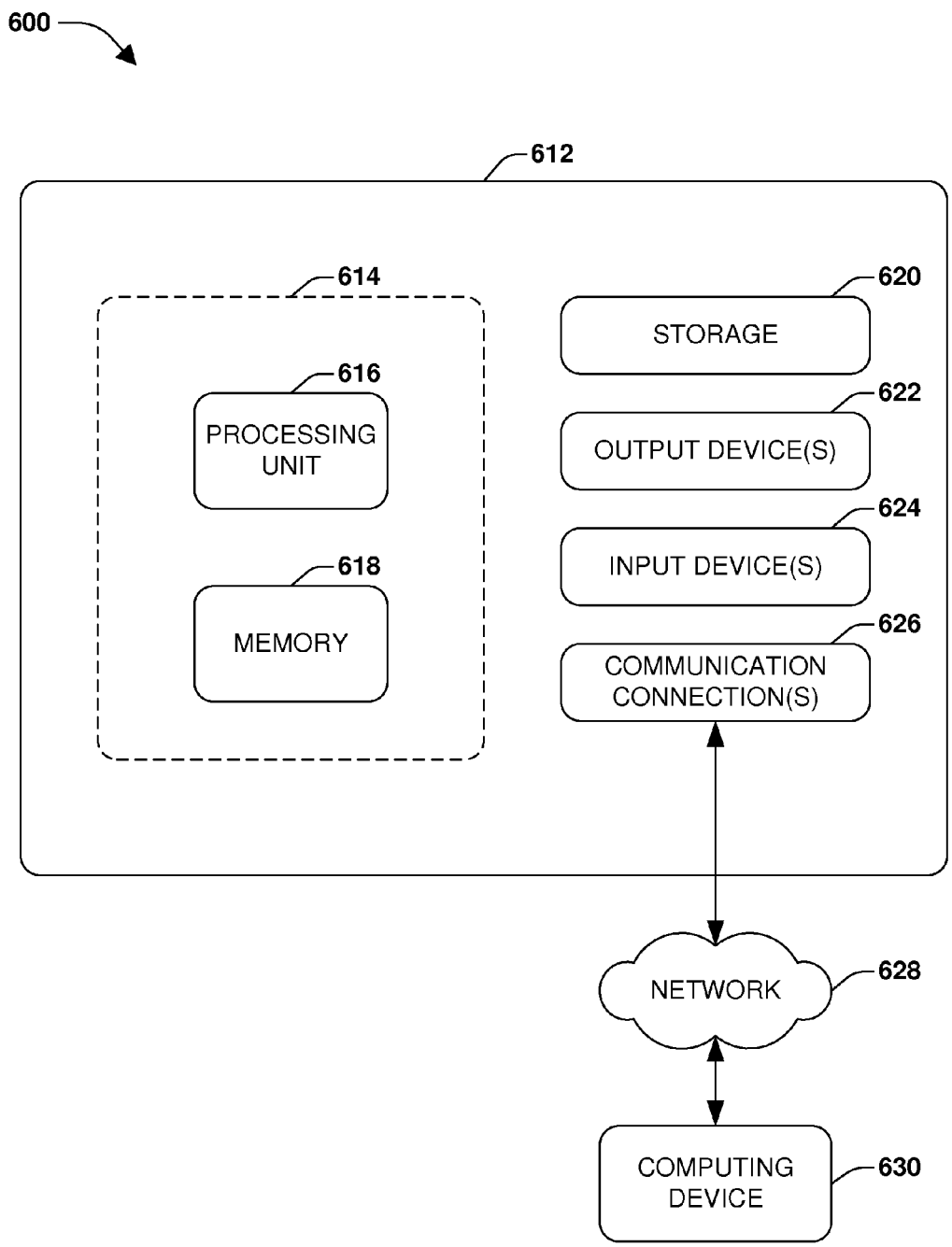
FIG. 6 is an illustration of an example computing environment where one or more of the provisions set forth herein are implemented, according to one or more embodiments.

For one or more of the figures herein, one or more boundaries, such as boundary 614 of FIG. 6, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

The following terms are used throughout the disclosure, the definitions of which are provided herein to assist in understanding one or more aspects of the disclosure.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether the events are correlated in close temporal proximity, and whether the events and data come from one or several event and data sources.

A tracking entity may be an entity associated with location tracking for one or more users. For example, a tracking entity may be a party or a user who receives location data or encrypted location data associated with one or more devices. In one or more embodiments, the tracking entity may be a company or an enterprise. A tracking entity may initiate one or more requests for location tracking and also be a requesting user (who initiated one or more requests for location tracking). Additionally, a user may include a team member, a customer, an individual, a person, an entity, an employee, participant, etc.

FIG. 1 is an illustration of a component diagram of an example system 100 for location tracking, according to one or more embodiments. The system 100 may include a request component 110, a management component 120, a location component 130, a notification component 140, an interface component 150, and an encryption component 160.

In one or more embodiments, the encryption component 160 may calculate or determine an encryption key. The encryption component may generate different encryption keys on a periodic basis. The encryption key may be utilized to encrypt location data determined by the location component 130 of a device employing the system 100 for location tracking. Similarly, the encryption key may be utilized to decrypt the encrypted location data. In other words, symmetrical encryption may be employed, for example. Additionally, different encryption schemes may be utilized, such as RSA encryption, for example. The location component 130 may transmit or send the encryption key(s) to a third party for safekeeping. Generally, the third party may transmit the encryption key to the tracking entity upon request to the third party. In some embodiments, the third party may transmit the encryption key when permission is granted by a user of the device for the tracking entity to share the encryption key with other parties. In the meantime, encrypted location data may be sent or transmitted to the tracking entity on an ongoing basis. Accordingly, the system 100 may track user locations in the event of an emergency, while providing peace of mind to users that their locations are not being tracked during non-emergency scenarios. For example, without the encryption key together with the encrypted location data, neither the third party nor the tracking entity may determine the location or location history of a user of a device, unless permission is given, such as in the form of a response (e.g., indicative of consent or approval) to the request for location tracking, for example. It will be appreciated that in one or more embodiments, permission or consent may be implied when a user installs or downloads a tracking application to his or her device.

Accordingly, when a response indicative of consent to a request for location tracking is received by a tracking system (e.g., associated with a tracking entity), the tracking system may present that response to the third party or third party storage component, which would then provide the tracking entity (which already has the encrypted location data) with a corresponding encryption key, thereby enabling the tracking entity to decrypt the encrypted location data and determine one or more locations or a location history associated with a user. Alternatively, asymmetric encryption may be utilized such that a public key is utilized to encrypt location data, and a private key is provided to the third party, which provides the private key to a requesting user or tracking entity when an appropriate or approval response is received (e.g., from a user of a mobile device and forwarded to the third party).

In other embodiments, the third party may not be utilized or no gatekeeper would be used, and location data may be stored locally on the device (which may or may not be encrypted) and provided on demand from the tracking entity or when a user of a device provides consent to a request for location tracking or does not disable location tracking after the notification is received. Again, it will be appreciated that consent may be implied based on installation or download of a tracking application and a notification may be provided to the user when tracking is enabled. Here, location tracking could be managed by the request component 110 (e.g., for manual or user responses) or the management component 120 (e.g., for automatic responses). For example, a control component 210 may transmit push notifications to one or more mobile devices or devices. Respective devices may have request components 110 which filter or determine whether a request or push notification applies to that device (e.g., based on job function, office location, job location, real-time location, etc.). In one or more embodiments, when a request component 110 of a device determines that a request or push notification is applicable, the location component 130 may determine or transmit a location of the device (e.g., which may not necessarily be encrypted) to a tracking entity (e.g., control component 210). Here, location tracking is enabled merely during emergency or business related scenarios which resulted in the tracking entity transmitting a request or push notification to one or more users or subsets of users. In this way, user or employee locations are merely transmitted during appropriate times and a need for encryption may be bypassed.

The request component 110 may be part of a device, mobile device, or remote device. In one or more embodiments, the request component 110 may perform filtering or determine whether a request received by a device applies to an individual or user associated with the device. In other words, the request component 110 may manage aspects related to request management such that a mobile device or device may receive a request and make a determination whether to present, notify, or proceed with that request based on known information, predetermined criteria, user attributes, etc. For example, when a requesting user requests that location tracking be enabled for his or her team members, a control component may transmit one or more requests to a plurality or multiple users or employees. Here, if a user is not associated or not a team member for the requesting user, that user's mobile device or device may receive the request for location tracking and ignore or filter the request such that no action is taken. The mobile device of a user may include information (e.g., a profile managed by the management component 120) which identifies whether a user meets criteria of a search or request, such as current location, job duties, or expertise, for example. If a user is a team member for the requesting user, his or her mobile device may notify that user that he or she is being tracked or is requested to provide his or her location accordingly, for example.

As another example, if a requesting user (e.g., tracking entity) initiates location tracking for individuals or users within a ten mile radius of a fire (e.g., notification area or notification radius), the mobile device may be utilized to procure or determine coordinates associated with a user, presumably because the device will be able to determine a location of a user. Here, in this scenario, one or more requests may be sent from a control component or tracking system to most any device or mobile device and respective devices may filter one or more of the requests accordingly (e.g., based on a current location of the device) for presentation to users of respective devices.

For example, a mobile device not within the notification radius or notification area may receive the request via the request component 110 and determine a criteria of the request to be associated with location of the device or mobile device. To this end, the request component 110 may forward the request for location tracking to a location component 130, which may determine a location of the mobile device, device, location of a user of the device, current location, etc. A user of a device may not necessarily be forwarded or notified of a request, such as if a request does not match, meet, or fall within a scope of criteria. Here, the current location or location of mobile device or user may be determined by the location component 130 and passed back to the request component 110 for analysis. Continuing with this example, because the user or individual of this mobile is not within the notification area or notification radius, the request component 110 may determine that this device does not meet the criteria associated with the request or search, thereby ignoring the request and not presenting the request to the user.

As another example, a mobile device which is located within the notification radius or notification area may receive the request via the request component 110 and determine a criteria of the request to be associated with the location of the device or mobile device in a similar manner. Again, the request component 110 may forward the request for location tracking to a location component 130, which may determine a location of the mobile device. When the current location or location of mobile device or user is passed back to the request component 110 for analysis, the request component 110 may determine that the device does meet the criteria associated with the request or search because the location of the device is within the notification area or notification radius. To this end, the request component 110 may pass the request along to the notification component 140 for user approval prior to notifying a user of the device of the request and transmitting a response to the request to a control component or tracking system.

It will be appreciated that in one or more embodiments, encrypted location data (e.g., location data determined by location component 130 and encrypted by encryption component 160) may be transmitted or sent to a tracking entity on an ongoing basis. An encryption key utilized to decrypt the encrypted location data may be transmitted to a third party. Here, when the notification component 140 notifies a user of a device or mobile device of a request, a response may be provided to a requesting user or tracking entity to approve or deny a corresponding request. The tracking entity or the requesting user may provide a response indicative of approval of a location tracking request to the third party to receive an encryption key. In other words, when a third party is sent a response associated with approval of tracking, the third party may release the encryption key or transmit the encryption key to the tracking entity or requesting user.

Accordingly, the request component 110 of respective devices may determine whether a corresponding mobile device meets criteria associated with the request (e.g., whether a mobile device is within a notification area). Explained another way, the request component 110 may cause the location component 130 to (internally within a mobile device) determine a current location of the device or mobile device. This location may be compared to parameters or criteria associated with a request, either on-board of the mobile device or sent to a third-party for comparison or criteria verification. In this way, filtering of requests may be performed device side or third-party side, rather than server side, thereby enabling a system for location tracking to contact or request location tracking from a desired or correct cross-section of employees or users without requiring non-encrypted location data or an encryption key to be sent or transmitted to the requesting user prior to obtaining permission or consent from one or more of the users. Regardless of how performed, it will be appreciated that a component within a system for location tracking may ensure that the appropriate group of individuals or users receives the request for location tracking.

Other examples of filtering criteria, parameters, or criteria may include a location of a user, one or more user attributes (e.g., office location, place of business, schedule, calendar appointments, work location, current location, a notification radius, a notification area, real-time location, present geographical location, job description, job title, job duties or job function, organization, hierarchy, job type, personal preferences), one or more user attributes for other users (e.g., a distress beacon of another user, team member, co-worker, acquaintance, such as when another individual is on a friend list for a user, etc.), or one or more situational factors (e.g., duration of an emergency, number of distress beacons activated, a danger level associated with a scenario or emergency, etc.). Again, it will be appreciated that determination of whether a user or individual meets criteria, one or more parameters, or falls within the scope of a request may be performed on a mobile device (e.g., device side), on a control component (e.g., server side), or sent to a third party for verification. Explained yet another way, criteria matching or criteria comparison for a request may be performed by the control component (see FIG. 2), the request component 110, or a third party.

The request component 110 may be utilized by a user who may be tracked to manage privacy of his or her location tracking. For example, the request component 110 interact with the notification component 140 to alert or provide a notification to a user when location tracking is requested. Further, upon reviewing the notification, the user may interact with the request component 110 via an interface rendered by the interface component 150 and enable or disable location tracking accordingly. As a result, the request component 110 enables a user to select whether location tracking should be activated on a request by request basis. For example, a user may respond to a request by providing the request component 110 with a response to the request which indicates whether to enable or disable location tracking for the corresponding request. In this way, control of location tracking requests may be provided for one or more users.

In one or more embodiments, the management component 120 may implement a timeout scheme if a response is not provided by the user within a predetermined timeframe (e.g., a response to a request for location tracking via the request component 110). For example, if a requesting user initiates a request for location tracking for a group of individuals, when an individual fails to respond or does not respond within a predetermined time period (e.g., thirty minutes), the management component 120 of a device may enable automatic location tracking for an individual associated with the device via an automatic response. In other words, the management component 120 may provide a response to the request component 110 which indicates that location tracking is to be enabled or to automatically consent to location tracking. In one or more embodiments, this automatically provided response created by the management component 120 may be distinct or different than manually provided responses indicative of consent provided directly by a user.

In other embodiments, a control component or tracking system may generate an automatic response in a similar manner if the predetermined timeframe has elapsed and no response has been received from the device and a legitimate reason is provided to the third party. In other words, if a device is destroyed or otherwise non-responsive, this enables a requesting user or tracking entity to obtain encryption keys to facilitate location tracking (e.g., without a user response).

In one or more embodiments, the management component 120 may manage granularity of location data transmitted or sent to the control component. In other words, the management component 120 may control a level of detail associated with location data sent to a requesting user or user who requests location tracking. For example, if a first requesting user has a first level of access, the management component 120 may merely provide a rough location (e.g., city, state, zip code, etc.) associated with one or more users targeted by a request. In other words, the management component 120 may regulate location data transmitted to the requesting user based on the level of access he or she has (e.g., the first access level). A second user associated with a second level of access may be provided with additional location data, such as global positioning system (GPS) coordinates based on the second level of access, which is greater than the first level of access, for example.

As another example, if automatic location tracking is enabled due to a failure of a user to respond to a location tracking request or a non-response to a location tracking request, location data provided to a control component, tracking system, or tracking entity may be generalized, such that exact coordinates are not provided. For example, a location component 130 may provide or transmit two sets of encrypted location data to a tracking entity on an ongoing basis, where a first set may be indicative of rough coordinates (e.g., zip code, city, state, etc.) and the second set may be indicative of more precise coordinates (e.g., GPS coordinates) and may be collected more frequently than the first set of location data. The encryption component 160 may utilize different sets of encryption keys (and provide a third party with both sets) to encrypt the location data and have the third party provide the encryption key corresponding to the less precise set of location data when an automatic response is provided, thereby enhancing privacy of automatically shared information. Here, if automatic location tracking is enabled, the management component 120 may merely provide the encryption key for obtaining city and state location data, rather than global positioning system (GPS) coordinates. In other embodiments, the management component 120 may pass exact coordinates or a current location of a user to the control component 210 without generalization or masking of such location data.

Additionally, the management component 120 may enable users to setup preferences to manage specificity of location data to be provided when a request is received. In other words, a user may select a preference or option which indicates that rough, general, or limited location data (e.g., city and state location data, a zip code, etc.) should be provided when requested, rather than exact coordinates (e.g., GPS coordinates, etc.). For example, when the user selects an option to provide more limited or rough location data, the location component 130 may determine a location of a device, and the encryption component 160 may encrypt the location data such that the encrypted location data may, when decrypted, be indicative of merely city, state, or zip code associated with a user, for example.

In one or more embodiments, the management component 120 may enable a user to setup one or more preferences, such as a timeout duration (after which automatic location tracking may be enabled or a corresponding response transmitted). In other words, the management component 120 may enable a user to choose or select a customized timeout window or timeout scheme such that an automated response may be provided by the management component 120 after the customized timeout window. Further, as previously discussed, the management component 120 may also allow a user to customize or select preferences which control or are indicative of a level of granularity of location data to be shared or transmitted with a requesting user. In other words, the management component 120 may enable users to control when a timeout occurs and how much location data to share with others or whether to have a timeout scheme enabled, for example.

In one or more embodiments, the management component 120 may enable a "location flare" (e.g., last known location, etc.) to be sent or transmitted from the device when a battery of the device is low (e.g., less than a threshold battery level) or when the device enters a low signal area where the signal is less than a threshold level. For example, a device or mobile device may have an option or preferences available via the management component 120 to enable location flares to be sent. If a user selects this option and a battery level of a mobile device falls below a threshold level (e.g., ten percent), the location component 130 of the device may determine a location of the device and transmit the location to a third party server or to a tracking system based on the battery level of the device. In one or more embodiments, the location data of a location flare may or may not be encrypted based on a user preference associated with or managed by the management component 120.

In one or more embodiments, the management component 120 may provide an option or a preference to disable location tracking altogether. For example, a request received by a device or mobile device with location tracking disabled may ignore a request without determining a location of the device using the location component 130 of the mobile device. In other words, the management component 120 may apply preferences selected by a user to ignore or block incoming location tracking requests, thus filtering unwanted or non-applicable requests accordingly.

Additionally, the management component 120 may enable a user to manually activate location tracking, transmit a distress signal, or initiate a beacon (e.g., distress beacon). For example, if a user is in trouble or would like assistance, such as from other team members or co-workers, the user may interface with the management component 120 to self-initiate location tracking. In other words, a user may actively provide his or her location to a tracking system or a control component 210 associated therewith. For example, when a user initiates location tracking from his or her end (e.g., a device-side initiated location tracking request), the management component 120 may interface with the notification component 140 to alert the user that he or she will be providing his or her location to a tracking system or control component. If a user continues with the self-initiated location tracking, the location component 130 may determine a location associated with the mobile device and transmit that location or current location (e.g., which may be in an unencrypted form) to a tracking system or control component.

In response to this, a tracking system or control component may send notifications or other location tracking requests to users in the area (e.g., a predefined area or within a radius of the location of the user associated with self-initiated location tracking). As a result of this, other users may be able to respond or provide assistance to the user who initiated location tracking. For example, the control component or tracking system may provide notifications to one or more users indicating a current location of the user who manually initiated location tracking. In one or more embodiments, location tracking requests may be sent to or target users within a predefined area or a radius around a location or current location of the user who initiated the tracking.

For example, a location tracking request may be sent to one or more users or corresponding devices (e.g., including users within a predefined area or radius of the user who initiated the tracking) and respective devices may determine one or more locations corresponding to the respective devices. The location tracking requests may include criteria or parameters indicative of which users for which location tracking may be desired. Here, in this example, the location tracking requests may indicate that location tracking is requested for individuals or users within a five mile radius of the individual or the first user (e.g., the user who self-initiating location tracking). To this end, respective devices may have request component(s) 110 which facilitate matching of these criteria with locations determined for the devices (e.g., via the location component 130). In one or more embodiments, a control component or tracking system may merely notify users of the location of the first user in response to manual responses to the location tracking requests. In this way, assistance may be provided to the user who initiated the manual location tracking feature of the system for location tracking.

The location component 130 may be utilized to determine a location of a device or mobile device or a location of a user of a device or mobile device. For example, the location component 130 may include an antenna, a receiver, a global positioning system (GPS), one or more telematics components, etc. As discussed, the management component 120 may provide a user of a mobile device with options or preferences to disable tracking. In these scenarios where a user chooses or selects a disable tracking option, the location component 130 may be disabled or manually disabled by a user. When this is done, the notification component 140 may provide a user with a confirmation notification that he or she is disabling location tracking. In one or more embodiments, when a user disables location tracking via the management component 120, an alert or notification may be transmitted to a tracking system, tracking entity, or control component which may be indicative that location tracking has been disabled for that individual or user. This enables the tracking system or control component 210 (e.g., of FIG. 2) to account for that individual if an emergency scenario arises, for example.

In one or more embodiments, the location component 130 may transmit a location flare or last known location of a device to a tracking system, tracking entity, third party, or control component when a user disables location tracking. In other words, the location component 130 may save the last known location based on deactivation of the location component 130, thereby providing a failsafe, a starting point, or a backup when tracking is intentionally disabled or manually disabled. Similarly, other embodiments may provide for a location flare to be sent based on a low battery level or entry into a low signal strength area, etc.

In one or more embodiments, such as when user or team member is in trouble, the user may intentionally enable location tracking (e.g., by initiating a location tracking application on his or her mobile device) and cause the device to communicate with a third party, tracking system, tracking entity, or control component and provide or publish the location of the user (e.g., which may be unencrypted) accordingly. Here, the location component 130 may be manually activated to determine and send or transmit a location of the mobile device or device to the tracking system, control component, or third party, thereby enabling one or more of the foregoing to provide assistance to the user. In this way, a user may utilize a system for location tracking to indicate an emergency situation, initiate a request for assistance, or the like via his or her mobile device, thereby promoting personal health and safety.

In one or more embodiments, such as during typical operation or during an operation mode, a system for location tracking may be remotely triggered based on a request for location tracking (e.g., received by the request component 110). For example, the request component 110 may monitor for one or more requests for location tracking (e.g., notifications or push notifications) or requests, which may be sent by a tracking system or a control component, for example. A request or location tracking request may be indicative of a desire (e.g., associated with a requesting user) to track or determine one or more locations or current locations of one or more mobile devices of one or more corresponding users. In other words, a request, when accepted or activated may enable tracking of a mobile device such that a tracking entity or requesting user may determine a location or location history associated with a user of a mobile device.

As discussed, in one or more embodiments, the location component 130 may determine a location of a device associated with a user and the encryption component 160 may encrypt the location such that encrypted location data is generated. The location component 130 may transmit the encrypted location data to a tracking entity or requesting user (without necessarily receiving approval or a response from a user of a device). An encryption key utilized to generate, encrypt, or decrypt location data may be provided or transmitted to a third party for safekeeping. Accordingly, when a user responds to a request for location tracking, the mobile device or location component 130 may broadcast this response to the tracking entity or requesting user such that the location of the device or mobile device may be determined by the tracking entity or requesting user. In other words, as a result of a response (e.g., a response indicative of approval of location tracking), a third party may release or transmit an encryption key to the tracking entity or requesting user which enables the tracking entity to decode or decrypt encrypted location data which has been received (e.g., on an ongoing basis).

As discussed, the location component 130 may be utilized to facilitate filtering or management of requests such that relevant requests are applied to groups of users or team members associated with criteria of a request. For example, the request component 110 may listen, receive, or poll for requests (e.g., which may be in the form of push notifications) related to tracking (e.g., alert users within a geographical area, etc.) and pass this along to the location component 130, if relevant to the user or team member, for example. Accordingly, the location component 130 may determine a location of a device to facilitate a comparison of the location of the device with corresponding search criteria (e.g., whether a device is within a notification area or geographical area). Examples of location data detected, recorded, sent, or transmitted may include one or more global positioning system (GPS) coordinates, a bearing of the user (e.g., a direction the user is travelling), a velocity, location history, call history, data history, current usage, other statistics or data, activity log, time of last input from the user, etc.

In one or more embodiments, the system 100 for location tracking may utilize the location component 130 to track a location of a user on an ongoing basis or update the location of the user and utilized the updated location to provide notifications accordingly. For example, if a user or team member is not within a notification radius or a notification area, but later moves into the notification area, the notification component 140 may provide the user with a notification upon the user entering the notification area. In this way, the system for location tracking may act as or provide a "protective bubble" for users utilizing the system. Conversely, if a user or team member leaves or exits a notification area or notification radius, the system 100 may have the notification component 140 withdraw the notification or send a second notification to the user which informs the user that they have left the notification area and that they may disregard the previous notification, for example. In other examples, if an emergency has passed or the reason for location tracking has passed, the notification component 140 may provide notifications to users accordingly.

The notification component 140 may notify or provide one or more notifications to a user of a mobile device when a request for location tracking is received by the request component 110. In one or more embodiments, the management component 120 may provide the user with options or preferences to enable or disable such notifications. It will be appreciated that the notification component 140 may provide different types of notifications or alerts to a user. For example, a notification may include auditory, visual, tactile, or other types of feedback for a user. In other words, a notification may include vibrating a device, a text message, a ringtone, an email, changing a color of an icon, be in the form of a push notification, etc. Regardless, alerts or notifications may be provided to one or more users prior to engaging in location tracking or providing responses associated with location tracking requests.

In one or more embodiments, the notification component 140 may provide one or more notifications which include details or information associated with a user who initiated the request (e.g., a requesting user), a reason for a request, a reason for tracking, a duration of the tracking, etc. Further, a notification may explain why tracking has been enabled, instructions on how to respond to a scenario, a suggested action, a suggested response, etc. A suggested action may be presented by the notification component 140. For example, the notification component 140 may render a notification which indicates a path of danger or a suggested travel path.

The suggested travel path may be a path, which when followed, leads the user, team member, or customer away from the path of danger (e.g., a projected pathway of a tornado).

The interface component 150 may render or provide an interface which enables a user to respond to a request for location tracking by approving, denying, or ignoring a request for location tracking. Additionally, the interface component 150 may enable users to interact with a profile or manage one or more user preferences managed by the management component 120. Other aspects provided by the interface component 150 may include an interface for providing feedback (e.g., such that a user may report abuse, alert the requesting user or tracking entity that an emergency is over, the emergency was a false alarm, confirm that an emergency is occurring, request additional assistance, etc.).

In one or more embodiments, a system 100 for location tracking may be provided to customers or external service providers. For example, a customer may be provided with a control component or tracking system which enables the customer to initiate requests for location tracking. A service of acting as a fiduciary or third party (e.g., third party key holder) may be provided to the customer. Here, the customer may receive encrypted location data associated with one or more users to be tracked. A third party may receive encryption keys and act as an additional layer between users and the customer who may initiate location tracking, for example.

Figure 2:
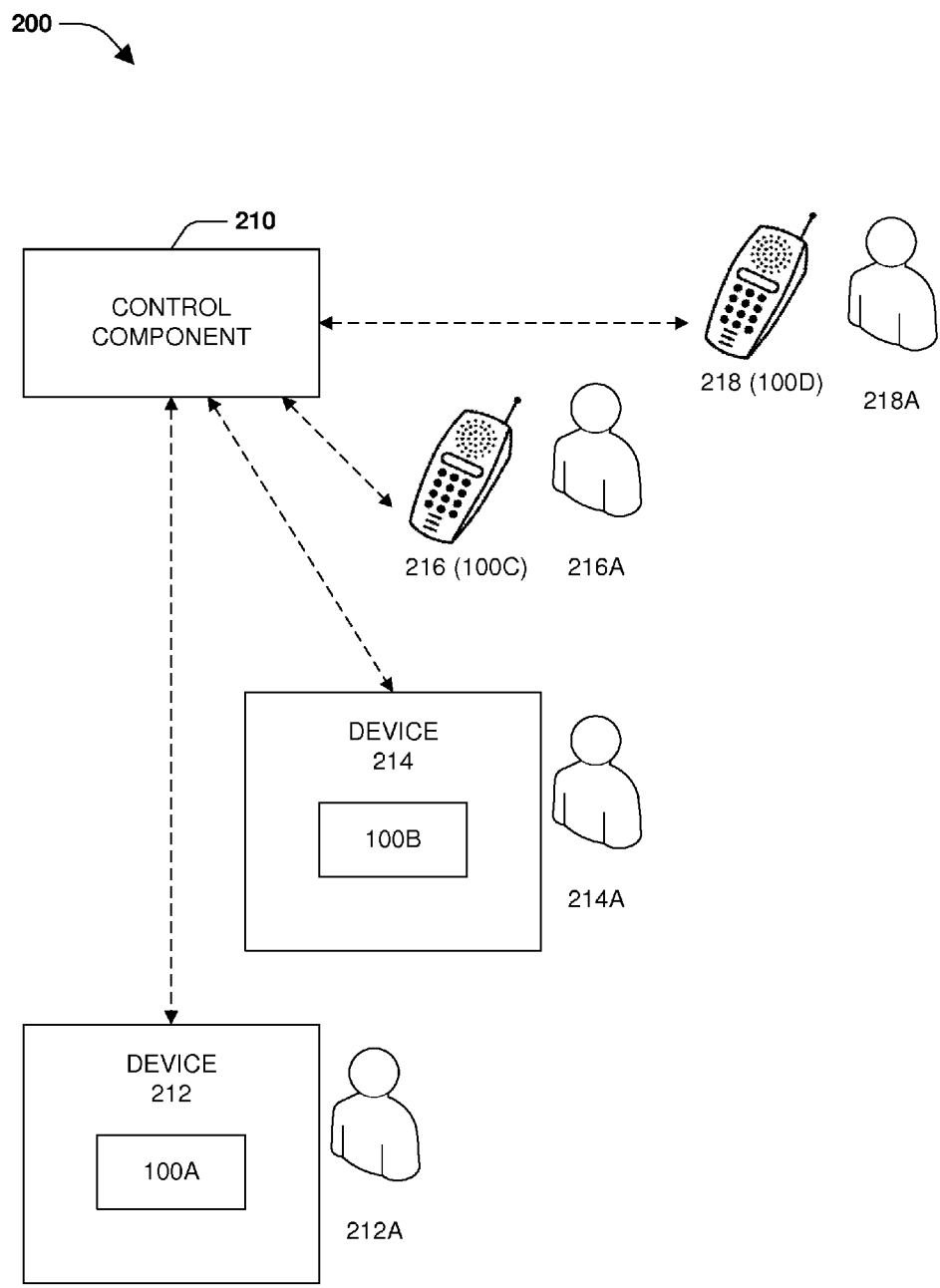
FIG. 2 is an illustration of an example scenario where systems for location tracking are employed, according to one or more embodiments.

FIG. 2 is an illustration of an example scenario 200 where systems for location tracking are employed, according to one or more embodiments. Here, a control component 210 may enable a user, such as a requesting user or tracking entity to manage one or more requests for location tracking. In this example, the control component 210 may transmit one or more location requests to one or more devices 212, 214, 216, and 218 associated with one or more corresponding users 212A, 214A, 216A, and 218A. Respective devices 212, 214, 216, and 218 may employ one or more systems for location tracking 100A, 100B, 100C, and 100D, for example.

The control component 210 may enable a user, such as a high level user, a super user, or user to transmit a request for location tracking to one or more devices or remote devices. In other words, the control component 210 may execute or implement an application which initiates tracking in the form of a request or location tracking request for one or more users or a group of users, for example. In one or more embodiments, the control component 210 may be a server, a device, or implemented across multiple devices as a centralized application, which may be downloaded and installed on one or more devices. Accordingly, a system for location tracking, such as a system 100 of FIG. 1 may include the control component 210 in one or more embodiments, such as when the system 100 includes a front-end interface for location tracking and a back-end interface for initiation of requests for location tracking. In other embodiments, the control component 210 may be a part of another system, such as a tracking system utilized to manage requests for location tracking.

When a request for location tracking is initiated by a user utilizing or interfacing with a tracking system or the control component 210, the control component 210 may record an identity of an individual or user who initiated the request. In this way, the control component 210 may provide accountability as well as record keeping for location tracking. For example, if a manager initiates a request for location tracking for one or more employees or users, the control component 210 may store an identity associated with the manager or user account of the manager for future reference. Other components (e.g., a notification component of a system for location tracking 100, 100A, 100B, etc.) may utilize the identity information, such as by providing users who are having their location tracked with "requested by" information.

The control component 210 may utilize identity information associated with a requesting user to provide verification of reasoning for location tracking. In one or more embodiments, two or more users may be required to initiate a request to ensure privacy of users, for example. In other embodiments, merely a single user may initiate the request for location tracking. The control component 210 may also request reasoning for location tracking. In this way, the control component 210 may collect information associated with why a request for location tracking was initiated. Similarly, other components, such as a notification component 140 of a system 100 for location tracking of FIG. 1, may utilize the information associated with why a request was initiated by providing users (e.g., reason for tracking) who are having their location tracked with "reason for tracking" information.

In one or more embodiments, the control component 210 may be part of a tracking system, which may be centralized. As an example, the control component 210 may implement a control application which may be utilized to manage communication with one or more devices or mobile devices and tracking associated therewith. The control application may communicate with one or more remote devices, mobile devices, or devices and transmit requests to one or more users of respective devices, thereby alerting one or more of the users of location tracking when a business need, legitimate reason, or emergency arises. An interface component 150 may facilitate interaction between a user and the control application by providing an interface, which may be executed or implemented via the control component. In one or more embodiments, the control application may be accessible from multiple devices, such as via a mobile interface or a browser interface. For example, a user wishing to initiate a request for location tracking may navigate to a corresponding uniform resource locator (URL) or web address, login, and initiate the request.

Access to location tracking or different levels of location tracking may be based on a level of access associated with the user making the request or initiating the request. For example, login credentials of a user may be utilized to identify whether a user has sufficient access rights or privileges to initiate location tracking for one or more users via the control component 210. In other embodiments, approval may be granted by other departments or entities utilizing the control component, such as human resources, before a request may be initiated or completed. In other words, multiple layers of verification may be provided by one or more entities to facilitate initiation of location tracking requests via the control component.

The control component 210 may filter one or more requests for location tracking or aggregate a list of users to which to transmit or send requests. In other words, the control component 210 may manage one or more aspects related to identification of parties, user, or entities who should be tracked. Explained yet another way, this may mean that filtering, request management, or determination of target parties or users may be performed server side, according to one or more embodiments. As an example, if a user or requesting user initiates a request to have location tracking occur for members associated with his or her team, the control component 210 may identify team members or users who are associated with the requesting user. To this end, the control component 210 may aggregate this list of users and transmit one or more requests for location tracking to one or more corresponding users (e.g., team members working for a manager) or users who meet criteria associated with the request. Here, in FIG. 2, users 212A, 214A, 216A, and 218A are determined by the control component 210 to be team members who fall within a scope of a request criteria.

Figure 3:
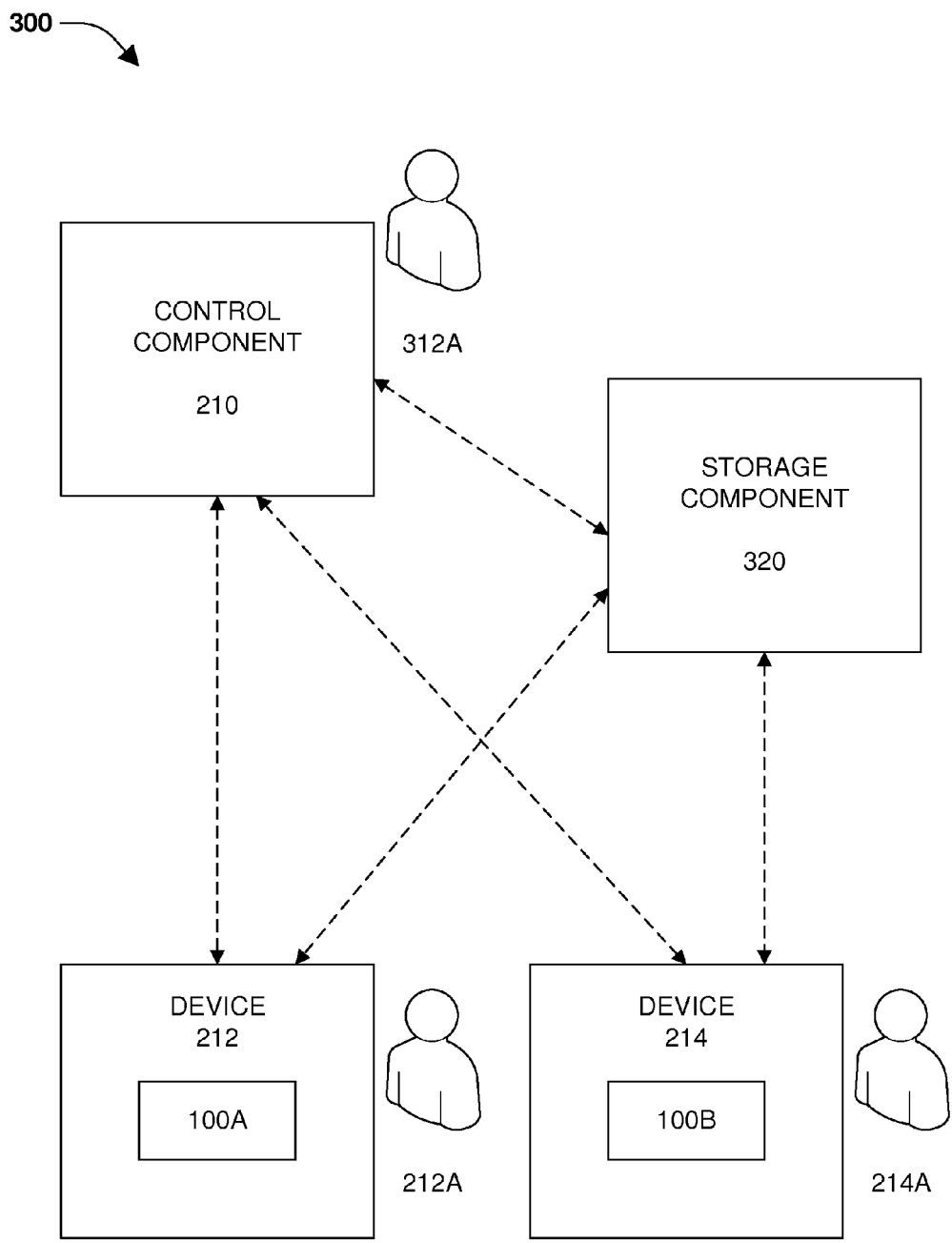
FIG. 3 is an illustration of an example scenario where systems for location tracking are employed, according to one or more embodiments.

FIG. 3 is an illustration of an example scenario 300 where systems for location tracking are employed, according to one or more embodiments. In this example, devices 212 and 214 are associated with users 212A and 214A, respectively. These devices 212 and 214 may include systems for location tracking 100A and 100B, respectively. As a result, devices 212 and 214 may encrypt and transmit encrypted location data associated with respective devices to the control component 210 (without any requests from a requesting user 312A). Additionally, the devices 212 and 214 may transmit corresponding encryption keys to a third party (e.g., third party storage component 320). When the requesting user 312A utilizes the control component 210 to initiate requests for location tracking and responses indicative of acceptance to the requests are received, the control component 210 may forward these responses to the third party and receive corresponding encryption keys from the third party storage component 320. In this way, the control component 210 may obtain necessary encryption keys to decrypt encrypted location data received from devices 212 and 214, respectively.

Figure 4:
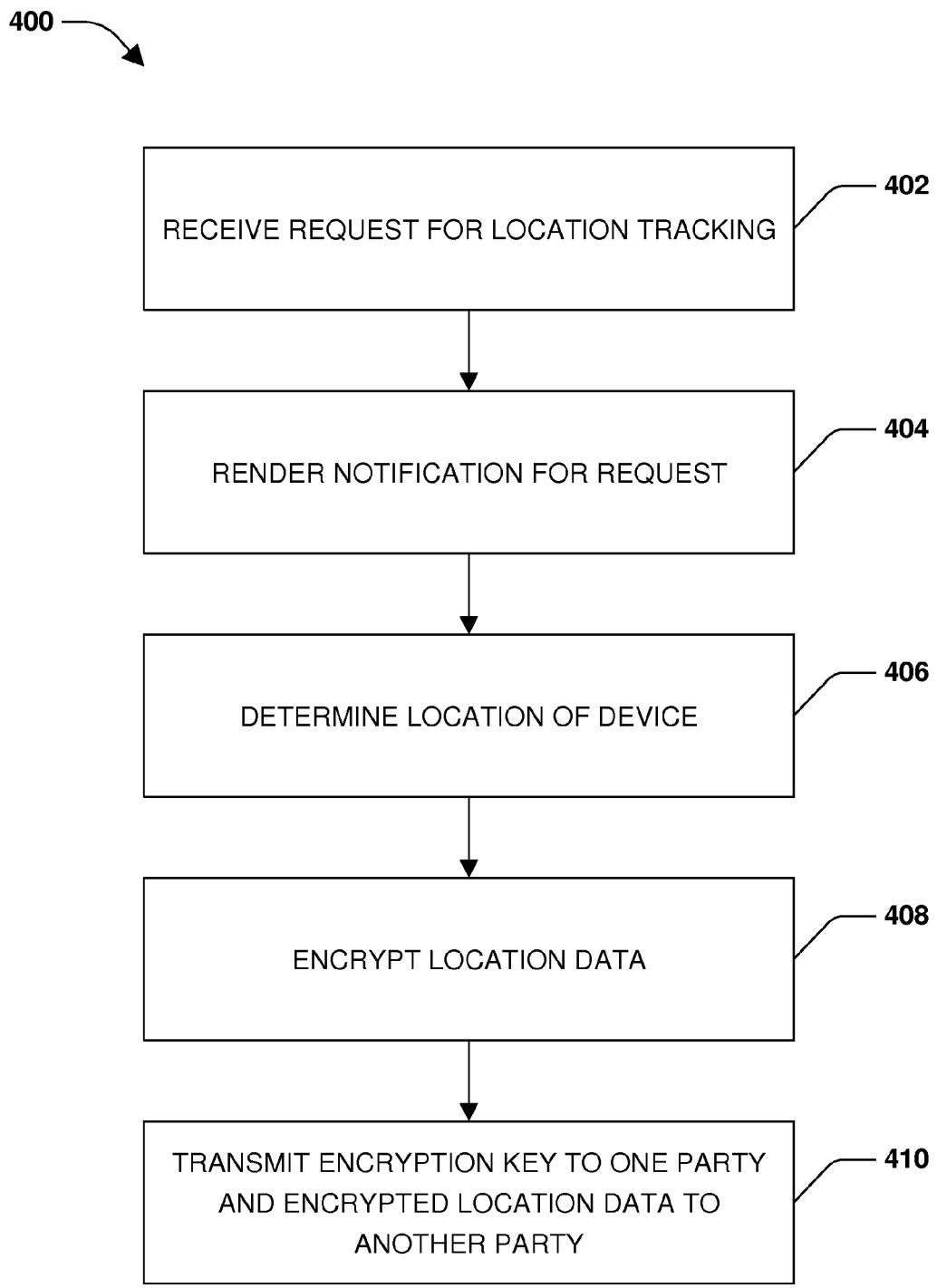
FIG. 4 is an illustration of an example flow diagram of a method for location tracking, according to one or more embodiments.

FIG. 4 is an illustration of an example flow diagram of a method 400 for location tracking, according to one or more embodiments. At 402, a request for location tracking may be received. At 404, a notification for the request may be rendered. At 406, a location of a device associated with a user may be determined. At 408, the location of the device may be encrypted utilizing or based on an encryption key. At 410, the encrypted location data may be transmitted to one party (e.g., a tracking entity or a requesting user regardless of whether a request has been made). Additionally at 410, the encryption key may be transmitted to another party, such as a third party fiduciary, for example.

Figure 5:
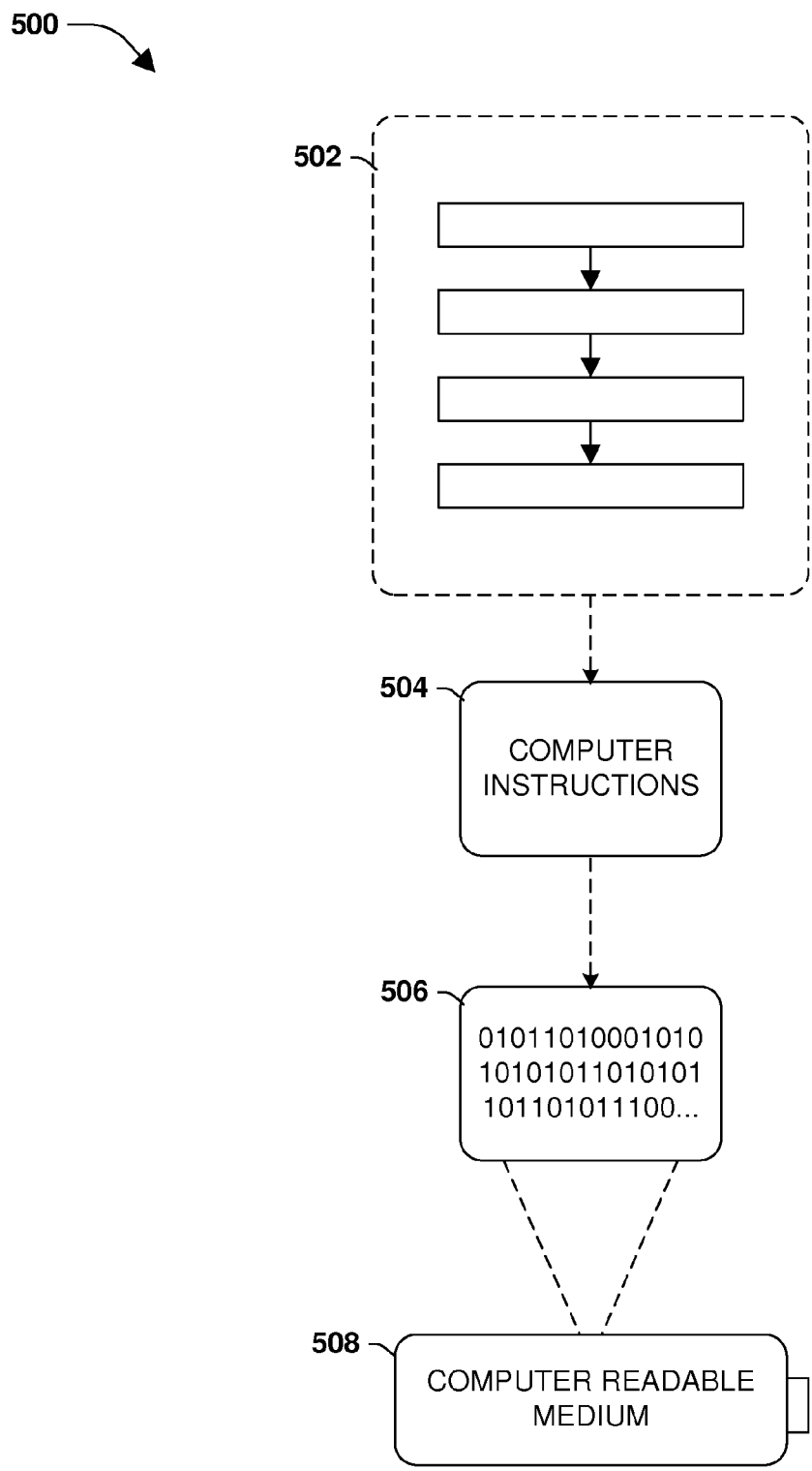
FIG. 5 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This computer-readable data 506, such as binary data including a plurality of zero's and one's as shown in 506, in turn includes a set of computer instructions 504 configured to operate according to one or more of the principles set forth herein. In one such embodiment 500, the processor-executable computer instructions 504 may be configured to perform a method 502, such as the method 300 of FIG. 3. In another embodiment, the processor-executable instructions 504 may be configured to implement a system, such as the system 100 of FIG. 1 or 210 of FIG. 2. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 6 and the following discussion provide a description of a suitable computing environment to implement embodiments of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one or more embodiments provided herein. In one configuration, computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other embodiments, device 612 includes additional features or functionality. For example, device 612 may include additional storage such as removable storage or non-removable storage, including, but not limited to, magnetic storage, optical storage, etc. Such additional storage is illustrated in FIG. 6 by storage 620. In one or more embodiments, computer readable instructions to implement one or more embodiments provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 612. Any such computer storage media is part of device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 612 includes input device(s) 624 such as keyboard, mouse, pen, voice input device, touch input device, infrared cameras, video input devices, or any other input device. Output device(s) 622 such as one or more displays, speakers, printers, or any other output device may be included with device 612. Input device(s) 624 and output device(s) 622 may be connected to device 612 via a wired connection, wireless connection, or any combination thereof. In one or more embodiments, an input device or an output device from another computing device may be used as input device(s) 624 or output device(s) 622 for computing device 612. Device 612 may include communication connection(s) 626 to facilitate communications with one or more other devices.

According to one or more aspects, a system for location tracking is provided, including a request component, a notification component, an encryption component, and a location component. The request component may receive one or more requests for location tracking from a tracking entity. One or more of the requests for location tracking may include one or more criteria. The notification component may provide one or more notifications corresponding to one or more of the requests for location tracking, such as to a user of a device. The encryption component may calculate an encryption key. A location component may determine a location of a device associated with the system for location tracking. The encryption component may encrypt location data indicative of the location of the device based on the encryption key and the location of the device. The location component may transmit the encryption key to a third party storage component and transmit the encrypted location data to the tracking entity. The request component may transmit a response to one or more of the requests back to the tracking entity.

The system may include a management component implementing a timeout scheme to provide the response to one or more of the requests for location tracking in an absence of a user response to one or more of the requests within a timeout window. The location component may determine the location of the device based on one or more of the criteria associated with one or more of the requests. The location component may transmit the encrypted location data based on one or more of the criteria associated with one or more of the requests. The management component may have or manage a profile associated with a user of the device, where the profile may be indicative of one or more user attributes or one or more user preferences. One or more of the user preferences of the profile may be indicative of a level of granularity and encrypted location data may be encrypted based on the level of granularity.

The request component may filters one or more of the requests for location tracking based on one or more of the corresponding criteria and the profile of the user. One or more of the requests may include a notification area criteria. The notification component provides one or more of the notifications based on the location of the device being within a scope of the notification area criteria. The system may include an interface component receiving the response to one or more of the requests for location tracking, such as from a user of the device.

According to one or more aspects, a method for location tracking may be provided, including receiving one or more requests for location tracking, wherein one or more of the requests for location tracking include one or more criteria, rendering one or more notifications corresponding to one or more of the requests for location tracking, determining a location of a device associated with the system for location tracking, and transmitting the location of the device to the tracking entity based on meeting one or more of the criteria of one or more of the requests.

The method may include transmitting the encrypted location data regardless of whether requests for location tracking are received or transmitting the location of the device via a telecommunications channel. One or more of the requests may include a notification area criteria. The method may include rendering one or more of the notifications based on the location of the device being within a scope of the notification area criteria. The method may include receiving the response to one or more of the requests for location tracking from a user of the device. The method may include receiving feedback pertaining to one or more of the requests for location tracking from a user of the device.

According to one or more aspects, a system for location tracking may be provided, including a request component, a notification component, an encryption component, and a location component. The request component may receive one or more requests for location tracking from a tracking entity, wherein one or more of the requests for location tracking may include one or more criteria. The notification component may provide one or more notifications corresponding to one or more of the requests for location tracking. The encryption component may calculate an encryption key. The location component may determine a location of a device associated with the system for location tracking. The encryption component may encrypt location data indicative of the location of the device based on the encryption key and the location of the device. The location component may transmit the encryption key to a third party storage component and transmit the encrypted location data to the tracking entity. The request component may transmit a response to one or more of the requests to the tracking entity, wherein the response may be indicative of consent, approval, or denial for one or more of the requests.

The system may include a management component managing a profile associated with a user of the device, wherein the profile may be indicative of one or more user attributes or one or more user preferences. One or more of the user preferences of the profile may be indicative of a level of granularity, wherein the encrypted location data may be encrypted based on the level of granularity. The request component may filter one or more of the requests for location tracking based on one or more of the corresponding criteria and the profile of the user.

According to one or more aspects, a system for location tracking is provided, including a control component. The control component may transmit one or more requests for location tracking associated with a tracking entity, wherein one or more of the requests for location tracking comprise one or more criteria. The control component may receive encrypted location data of a device associated with the system for location tracking, transmit one or more requests for an encryption key to a third party, receive the encryption key from the third party, and determine a location of the device based on the encrypted location data and the encryption key. The control component may be implemented via a processing unit. One or more of the requests may include a notification area criteria. The control component may store the encrypted location data. The third party may be an institution.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A non-transitory system for location tracking, comprising:
 a tracking entity determining a tracking scenario, the tracking scenario triggers a start of location tracking of at least one user device;
 a request component receiving one or more requests for location tracking from the tracking entity, wherein one or more of the requests for location tracking comprise one or more criteria;
 a notification component providing one or more notifications corresponding to one or more of the requests for location tracking;
 an encryption component calculating an encryption key; and
 a location component for:
  determining a location of a user device associated with the system for location tracking, wherein the encryption component encrypts location data indicative of the location of the device based on the encryption key and the location of the device;
  transmitting the encryption key to a third party storage component; and
  transmitting the encrypted location data to the tracking entity, wherein the request component transmits a response to one or more of the requests to the tracking entity,
 wherein the request component, the notification component, the encryption component, or the location component is implemented via a processing unit.

2. The system of claim 1, further comprising a management component implementing a timeout scheme to provide the response to one or more of the requests for location tracking in an absence of a user response to one or more of the requests within a timeout window.

3. The system of claim 1, wherein the location component determines the location of the device based on one or more of the criteria associated with one or more of the requests.

4. The system of claim 1, wherein the location component transmits the encrypted location data based on one or more of the criteria associated with one or more of the requests.

5. The system of claim 1, further comprising a management component having a profile associated with a user of the device, wherein the profile is indicative of one or more user attributes or one or more user preferences.

6. The system of claim 5, wherein one or more of the user preferences of the profile is indicative of a level of granularity, wherein the encrypted location data is encrypted based on the level of granularity.

7. The system of claim 5, wherein the request component filters one or more of the requests for location tracking based on one or more of the corresponding criteria and the profile of the user.

8. The system of claim 1, wherein one or more of the requests comprises a notification area criteria.

9. The system of claim 8, wherein the notification component provides one or more of the notifications based on the location of the device being within a scope of the notification area criteria.

10. The system of claim 1, further comprising an interface component receiving the response to one or more of the requests for location tracking.

11. A method for location tracking, comprising:
 determining a tracking scenario, the tracking scenario triggering a start of location tracking of at least one user device;
 receiving one or more requests for location tracking, wherein one or more of the requests for location tracking comprise one or more criteria;
 generating a notification to a user device;
 providing a tracking application for installation on the user device;

transmitting the notification to the user device over a server, the server having a processor and a memory, wherein the notification activates the tracking application on the user device to request tracking;

rendering one or more notifications corresponding to one or more of the requests for location tracking;

determining a location of a device associated with the system for location tracking;

transmitting the location of the device to the tracking entity based on meeting one or more of the criteria of one or more of the requests;

wherein the receiving, the rendering, the determining, the encrypting, or the transmitting is implemented via a processing unit.

12. The method of claim 11, further comprising transmitting the location of the device via a telecommunications channel.

13. The method of claim 11, wherein one or more of the requests comprises a notification area criteria.

14. The method of claim 13, further comprising rendering one or more of the notifications based on the location of the device being within a scope of the notification area criteria.

15. The method of claim 11, further comprising receiving the response to one or more of the requests for location tracking from a user of the device.

16. The method of claim 11, further comprising receiving feedback pertaining to one or more of the requests for location tracking from a user of the device.

17. A non-transitory system for location tracking, comprising:

a non-transitory control component:

determining a tracking scenario, the tracking scenario triggering a start of location tracking of at least one user device;

transmitting one or more requests for location tracking associated with a tracking entity, wherein one or more of the requests for location tracking comprise one or more criteria;

receiving encrypted location data of a device associated with the system for location tracking;

transmitting one or more requests for an encryption key to a third party;

receiving the encryption key from the third party; and determining a location of the device based on the encrypted location data and the encryption key, wherein the control component is implemented via a processing unit.

18. The system of claim 17, wherein one or more of the requests comprises a notification area criteria.

19. The system of claim 17, wherein the control component stores the encrypted location data.

20. The system of claim 17, wherein the third party is an institution.

* * * * *